United States Patent [19]  [11] 4,025,425
Croopnick et al. [45] May 24, 1977

[54] PURIFICATION APPARATUS

[75] Inventors: Gerald Allan Croopnick, Laguna Hills; John Mark Michaels, Irvine, both of Calif.

[73] Assignee: Dresser Industries, Inc., Dallas, Tex.

[22] Filed: Sept. 29, 1975

[21] Appl. No.: 617,683

[52] U.S. Cl. .............................. 210/23 H; 55/16; 210/321 R
[51] Int. Cl.² .................................. B01D 59/10
[58] Field of Search ............... 210/23 H, 331, 347, 210/486, 321 R; 55/16

[56] References Cited
UNITED STATES PATENTS

| | | | |
|---|---|---|---|
| 3,512,647 | 5/1970 | Young | 210/331 X |
| 3,669,879 | 6/1972 | Berriman | 210/23 H |
| 3,879,286 | 4/1975 | Berriman | 210/331 X |
| 3,948,779 | 4/1976 | Jackson | 210/331 |

Primary Examiner—Frank A. Spear, Jr.
Assistant Examiner—E. Rollins Cross
Attorney, Agent, or Firm—Lindenberg, Freilich, Wasserman, Rosen & Fernandez

[57] ABSTRACT

Apparatus is described for purifying waste water or other feed fluid, which includes a stack of membrane packs wherein each pack contains a conduit sheet, a pair of support sheets of filter paper or the like, each lying against a face of the conduit sheet, and a pair of membranes each lying over a filter paper sheet. The pack has exit holes, and the filter paper extends up to the exit hole walls and has a region thereabout which is impregnated with an adhesive which seals the filter paper against the inflow of concentrate while also holding the filter paper to the conduit sheet and membranes. The packs are spaced apart by inner and outer gaskets, the radially inner gaskets having central holes forming a feed pipe for carrying the feed fluid to all the packs. The stack of membrane packs is rapidly rotated to provide centrifugal forces that help sweep away membrane-plugging material during radial flow of feed fluid from the feed pipe to the peripheries of the packs, and the exit holes of all of the packs are formed near their peripheries and are aligned to thereby form a concentrate-carrying "pipe" with gaps that receive the concentrate.

18 Claims, 10 Drawing Figures

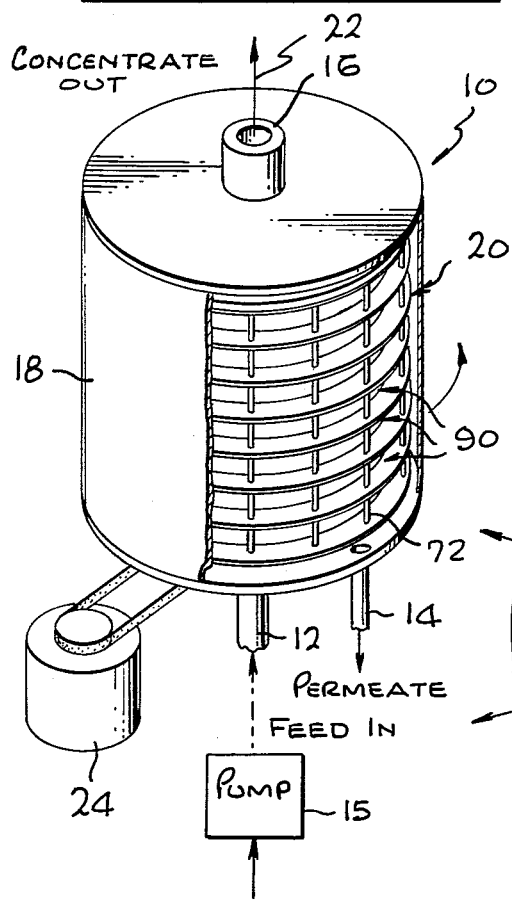
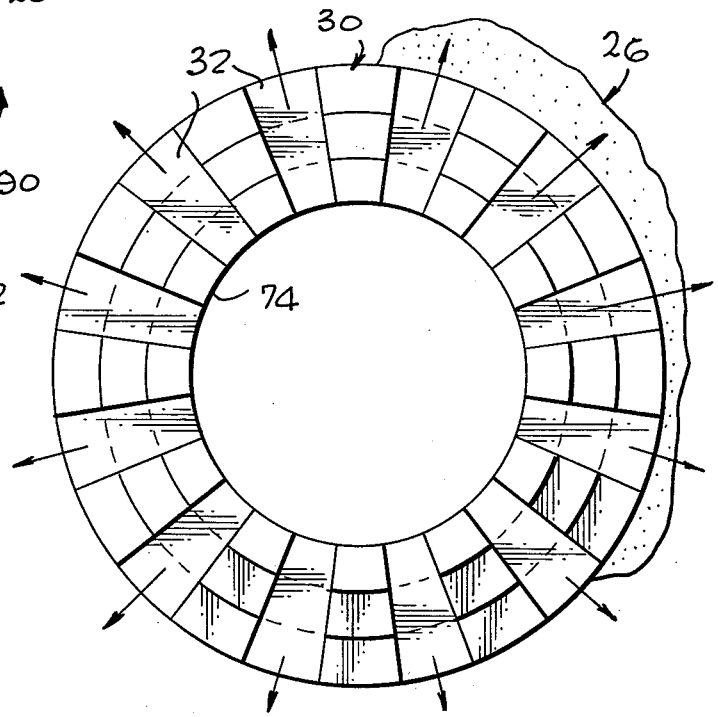
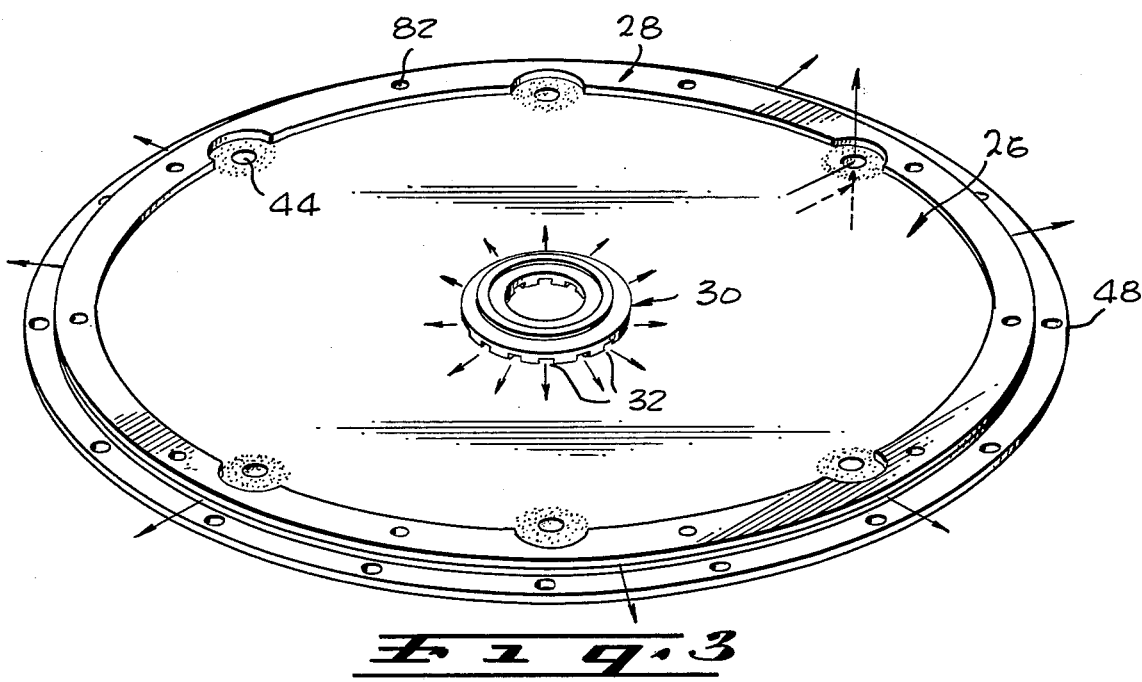

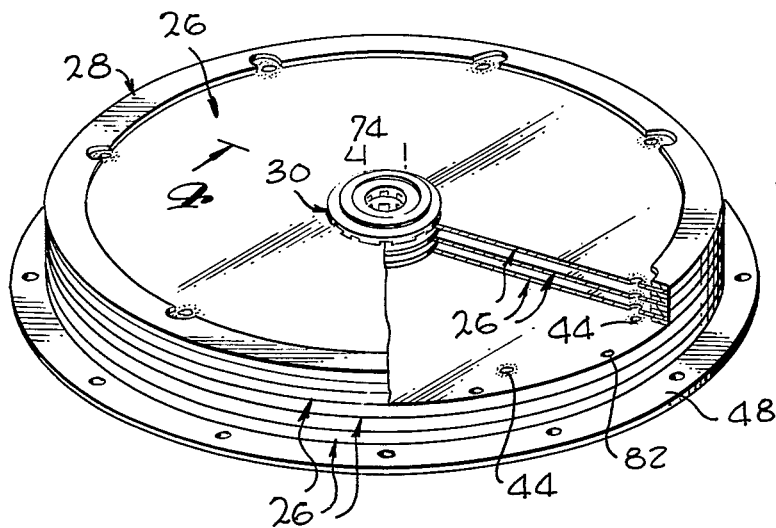
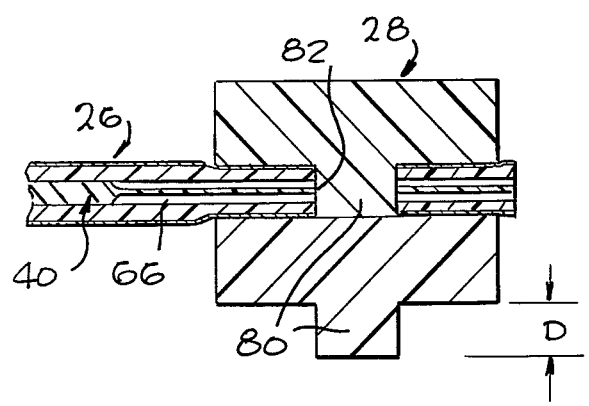
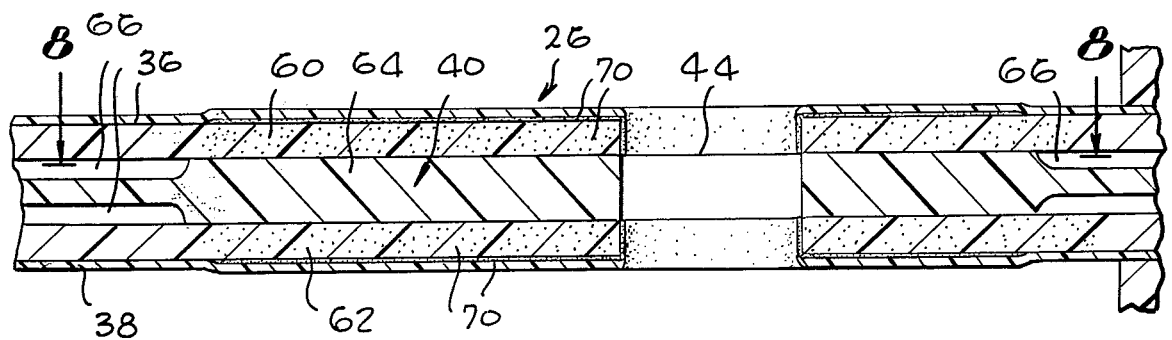

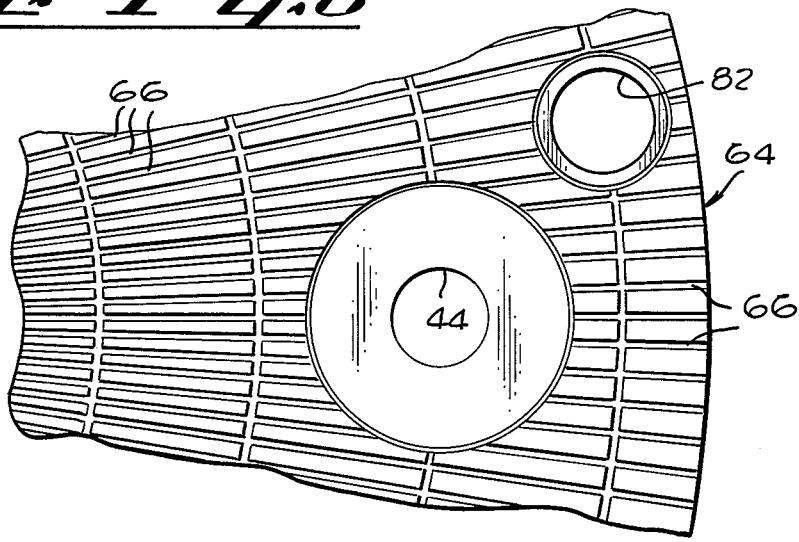
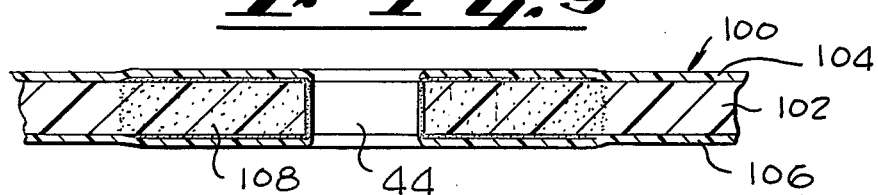
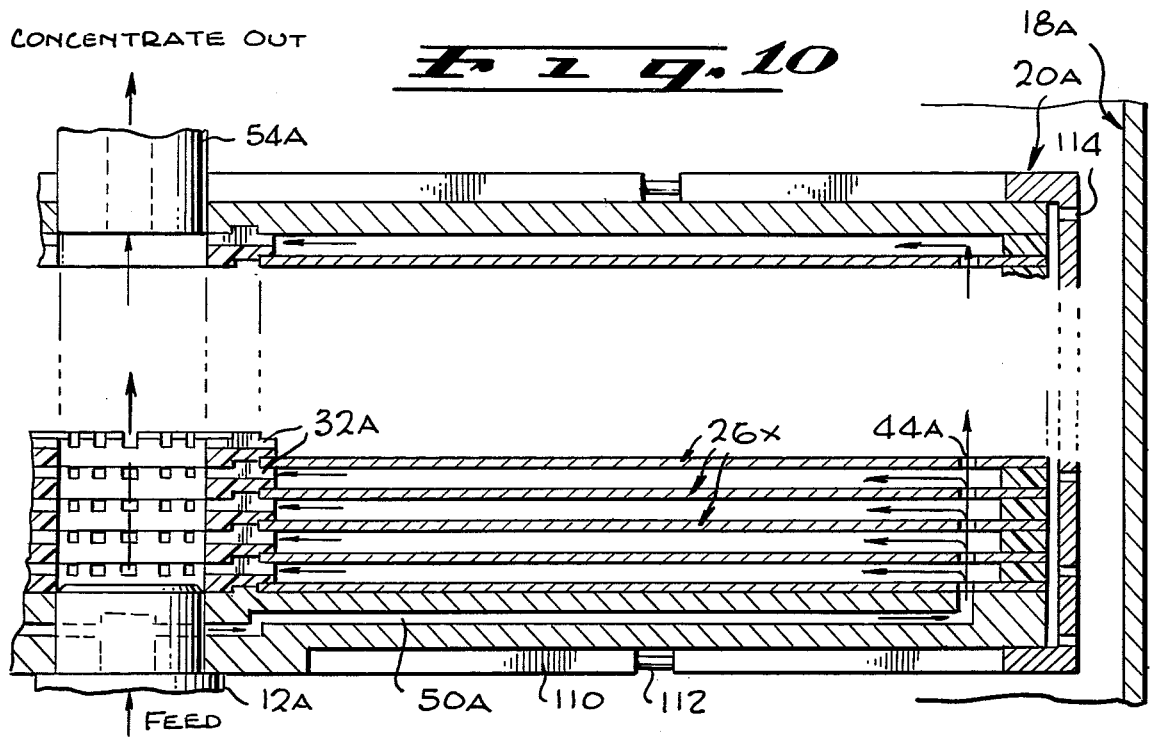

PURIFICATION APPARATUS

BACKGROUND OF THE INVENTION

Fluid separation for water purification or other purposes, is utilized to separate bacteria or other suspended particles from a carrier fluid, or to separate salt or other dissolved substances form the carrier fluid. Such purification can be accomplished by applying the feed fluid under pressure to a membrane that passes substantially fresh water or other permeate. There is usually only a small flux rate, or flow of permeate per unit area of membrane, through the membrane, so that a very large membrane area must be utilized. One technique for applying feed fluid at high pressure while also preventing the build-up of residue on the membrane, is to rotate the apparatus to create high centrifugal forces that help pressurize the feed fluid, help in the radial flow of permeate that has passed through the membrane, and help sweep away concentration polarization and membrane foulant material that could block the membrane. However, it is necessary to produce a very high membrane area per unit volume of a centrifugal device, if such a device is to be made economical enough to gain wide utilization.

SUMMARY OF THE INVENTION

In accordance with one embodiment of the present invention, a purifying apparatus is provided which is compact, economical, and reliable. The apparatus includes a stack of filtration packs, each including a sheet-like carrier and a pair of membranes lying over opposite faces of the carrier. The carrier and membranes having aligned exit holes, and the carrier is formed to a constant thickness up to the holes and is impregnated around the holes with an adhesive which blocks the flow of fluid into the carrier and which holds the membranes to the carrier. The packs are assembled along a predetermined axis into a stack, with radially inner and outer gaskets separating adjacent packs from one another. The inner gaskets are stacked to form the equivalent of a hollow shaft.

The assembled stack of packs and gaskets forms a rotor which is rapidly rotated, while water or other feed fluid is fed along the shaft formed by the inner gaskets and flows through grooves in the gaskets into the space between adjacent membrane packs. As the rotor rotates, the feed fluid flows radially outwardly, so that pure water or other permeate contained in the feed fluid, permeate through the membranes and passes radially outwardly along the pack to the periphery, where the permeate then flies off into a collecting vessel. Where the particles or solute are denser than the carrying fluid, the exit holes are formed near the periphery of the pack to receive the concentrate fluid. The exit holes of all packs are substantially aligned, to form a "pipe" through which the concentrate passes. The outer gaskets, which separate the membrane packs, are pressed together to compress the peripheral portions of the packs, to thereby seal the regions between the packs against the escape of concentrate. This can be accomplished by bosses formed on the outer gaskets which extend through holes in the packs and which are sealed to adjacent outer gaskets, the packs being compressed during such sealing of the gaskets to one another to form a pressure-tight closure.

The novel features of the invention are set forth with particularity in the appended claims. The invention will best be understood from the following description when read in conjunction with the accompanying drawings.

BRIEF DESCRIPTION OF THE DRAWINGS

FIG. 1 is a partially sectional perspective view of a separation apparatus constructed in accordance with the present invention;

FIG. 2 is a partial sectional perspective view of the apparatus of FIG. 1;

FIG. 3 is a perspective view of a portion of the apparatus of FIG. 2;

FIG. 5 is a view of one of the inner gaskets of the apparatus of FIG. 3, showing the bottom of the gasket;

FIG. 6 is a view of region 6—6 of FIG. 4;

FIG. 7 is a view of a portion of the membrane pack of FIG. 6, with the vertical dimensions being greatly enlarged;

FIG. 8 is a view taken on the line 8—8 of FIG. 7;

FIG. 9 is a partial sectional side view of a membrane pack constructed in accordance with another embodiment of the invention; and FIG. 10 is a partial sectional view of a separation apparatus constructed in accordance with another embodiment of the invention.

DESCRIPTION OF THE PREFERRED EMBODIMENT

Figure 4:
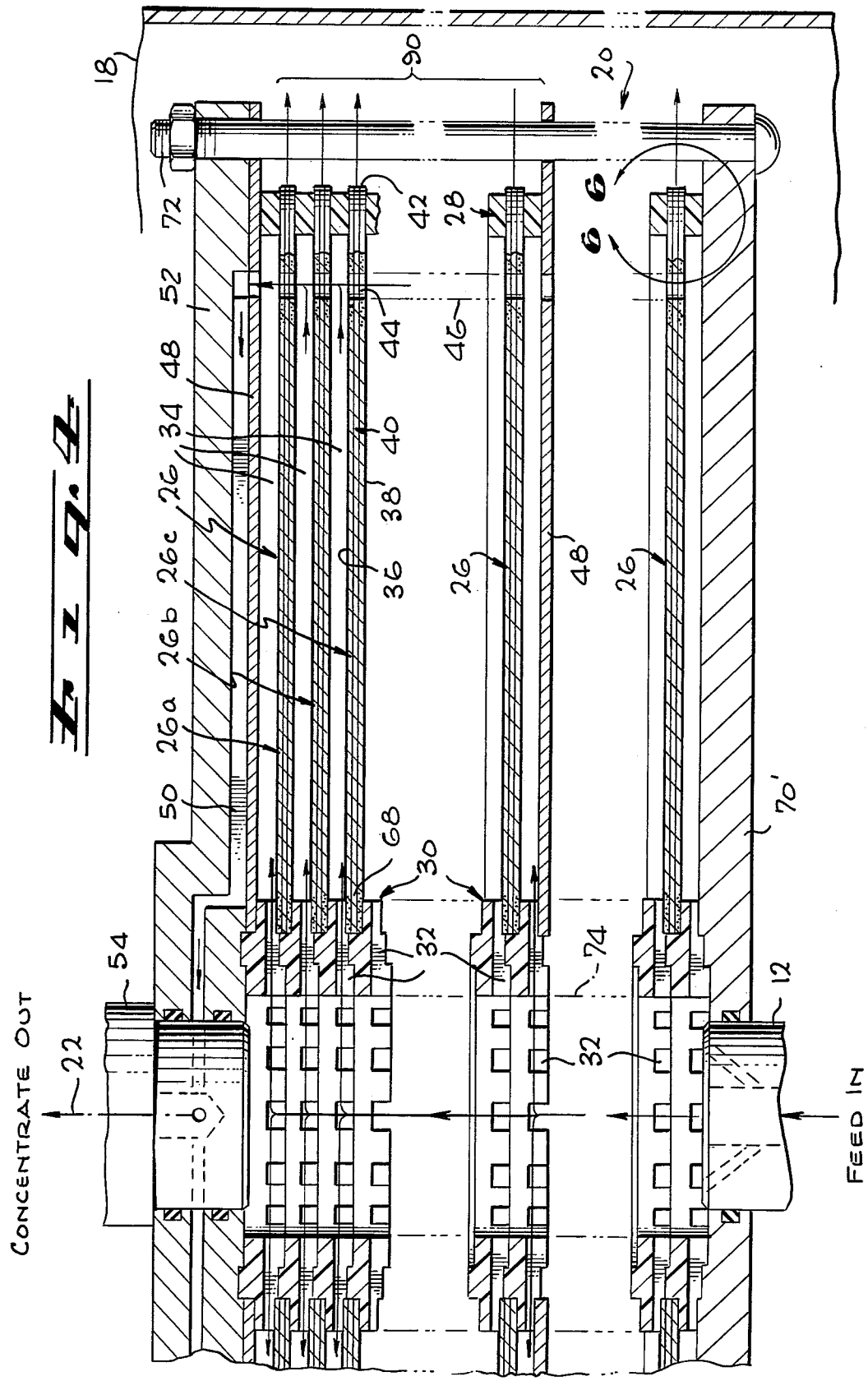
FIG. 4 is a view taken on the line 4—4 of FIG. 2.

As illustrated in FIG. 1, the separation or concentration apparatus 10 includes a feed fluid inlet 12 which receives a feed fluid such as waste water that may contain fine suspended particles such as bacteria and inorganic waste, or which may contain dissolved material such as salt. The feed fluid is obtained from a pump 15 that pressurizes the feed fluid. The apparatus also includes a permeate outlet 14 through which a permeate such as fresh water is obtained, and a concentrate outlet 16 through which concentrate such as water containing a high proportion of fine particles and dissolved material, is obtained. Of course, there are applications where the concentrate is a valuable product.

The apparatus includes a housing 18, a rotor 20 rotatably mounted within the housing along an axis 22, and a motor 24 which rotates the rotor 20 at high speed. As shown in FIG. 4, the rotor 20 includes a stack of membrane packs 26, labelled 26a,26b,etc., which are centered on the rotor axis 22. The membrane packs are spaced from one another by outer gaskets 28 lying near the peripheries of the packs and by inner gaskets 30 lying at the hub portions of the packs. Feed fluid which enters at the inlet 12, moves longitudinally, or parallel to the axis 22, along the hub portions of the rotor. The inner gaskets 30 have axial grooves 32 through which the feed fluid can pass, so that the feed fluid can pass into the feed regions 34 which lie between adjacent membrane packs. The rapid rotation of the rotor, and the fact that the spaces between the packs is devoid of obstructions to the radial outflow of the feed fluid, results in any residue (such as salt or particles) that tends to build up on the membranes being swept away by the combination of centrifugal forces and fluid flow. In fact, this avoidance of residue build-up is a major advantage of rotating the stack of packs instead of merely feeding the feed fluid into the packs under high pressure without rapidly rotating them.

Each membrane pack includes a pair of membranes 36, 38 and a plate-like or sheet-like carrier 40 sandwiched between the membranes. As the rotor turns, the feed fluid in the feed regions 34 moves radially outwardly toward the periphery of the rotor. Some of the feed fluid, such as fresh water that constitutes part of a waste water feed fluid, permeates through the membranes 36, 38 to reach the carrier 40 of the membrane pack. This fluid which has permeated through the membrane, and which is referred to as permeate, moves radially outwardly along the carrier 40 until it reaches the edge 42 at the extreme periphery of the membrane pack. The permeate is then ejected by centrifugal forces from the pack, so that the permeate falls into the housing 18 which functions as a collecting vessel. The centrifugal forces arising from rapid rotation of the rotor, helps move the permeate outwardly along the carrier.

The feed fluid which passes along the feed region 34 between the membrane packs, and from which some of the permeate has been removed, reaches the peripheral portion of the feed region with a concentration of suspended particles and/or dissolved solids, so that this fluid is referred to as concentrate. The concentrate cannot pass radially outwardly from the rotor because it is stopped by the outer gaskets 28. In order to permit removal of the concentrate, the membrane packs are formed with exit holes 44 near their peripheries. The exit holes 44 of the stack of membrane packs are substantially aligned to create a "pipe" 46 with gaps in it, the walls of the exit holes 44 forming solid portions of the "pipe" while the spaces between membrane packs form the gaps in the pipe. The concentrate created during fluid flow along each feed region 34, enters the pipe 46 through the gaps therein and flows longitudinally towards one end of the rotor, so that the packs with aligned exit holes forms a manifold for collecting the concentrate. The concentrate flows through a hole in a support plate 48, radially inwardly along a channel 50 of an end plate 52 of the rotor, and into a concentrate outlet 54.

It may be noted that the alignment of the exit holes of all packs and the feeding in of original feed fluid to all packs, results in the feed fluid moving slowly between the hub and peripheral regions of the packs. This may be compared to non-rotating systems where the feed fluid may flow in series through all packs, and may even flow in a spiral along the surface of each pack. Such a flow provides high fluid velocity at all regions to create turbulence and sweep away membrane-plugging material. However, the high velocity flow through a restricted area results in large pressure losses, and therefore considerable energy is required in pumping the fluid. In the present rotating system, moderate fluid velocity occurs only near the hub. As the fluid moves radially outwardly, the fluid velocity decreases, while centrifugal forces become increasingly intense. The centrifugal forces then serve to sweep away membrane-plugging material, and the space between packs is left unobstructed to radial flow. It also may be noted that in most situations, the particles, salt, or other rejected species, or rejectant, has a density greater than the feed fluid and the exit holes are located near the periphery of the rotor. However, where the rejectant is of lower density, the exit holes can be located near the hub of the rotor.

As illustrated in FIG. 7, the carrier 40 of each membrane pack includes a pair of porous sheets 60, 62 of support paper and a conduit sheet 64 of embossed plastic. The support paper sheets 60, 62, which have a high wet strength and which are very permeable, support the membranes 36, 38 provide pores through which the fresh water or other permeate can move towards the conduit sheet 64. The support sheets 60, 62 can be filter paper of the type which is used in oil filters and as battery plate separators, or can be any sheet which has a high permeability and wet strength. The conduit sheet 64 provides radially extending passages 66 along which the permeate can readily flow towards the periphery of the membrane pack. Woven screens can be utilized as the conduit sheet to provide radial passages for the permeate, but the embossed plastic sheet can be produced cheaply. As shown in FIG. 8, the embossed plastic conduit sheet 64 contains many fine channels 66 extending largely radially along the sheet to form radial passages for the permeate. However, in a region around the exit hole 44, the sheet is unembossed in order to help keep permeate away from the exit hole.

With permeate such as fresh water flowing radially along the carrier 40, and with concentrate such as water with a high concentration of bacteria or salt, flowing longitudinally through the exit holes 44, it is important to seal the exit hole regions of the membrane packs to prevent the entrance of concentrate into the carrier 40. In the prior art, it has not been possible to seal the edges of many desirable membrane materials in a reliable and low cost manner, except by sealing the membrane to another membrane or by the use of mechanical seals. Mechanical seals such as rubber grommets are not desirable, because they occupy excessive space between the packs and because the centrifugal forces on them result in excessive loading of the membrane pack.

In the present invention, the exit holes are sealed by impregnating the carrier with an adhesive 70 that tightly seals the membranes 36, 38 to the support paper sheets 60, 62. This provides a free standing seal (one that does not require external members to provide compressing forces) that not only seals the membranes to the carrier, but that also seals the support paper sheets against the movement of fluid through them by capillary action or otherwise in the region near the exit hole 44, and that also seals the support paper to the embossed plastic conduit sheet 64. A silicone material which is catalyzed, is utilized as the adhesive 70 to seal any pores of the support paper and to tightly adhere the sheets of support paper to the membranes and the conduit sheet.

It would be possible to cut away the support paper sheets 60, 62 around the exit holes areas and merely seal the membranes to the conduit sheet 64. However, this results in a change in thickness of the carrier and therefore steps or sudden changes of the level of the carrier surfaces, and it has been found that this produces wrinkles in the membranes 36, 38. Under high pressure, the wrinkles in the membrane tend to form creases which can crack and admit some of the concentrate into the permeate. Also, it has been found that where a wrinkle occurs in the membrane, the adhesive tends to separate from the outwardly-bowed line of the wrinkle, which can result in leaking of concentrate into the permeate. By extending the porous sheets of support paper all the way to the exit holes 44, abrupt changes in carrier thickness are avoided, and therefore wrinkles in the membrane are avoided, to thereby increase the reliability of the sealing around the exit hole regions.

The hub portions 68 (FIG. 4) of each of the membrane packs is also sealed with adhesive to prevent the entrance of feed fluid into the carrier of the membrane pack. The peripheral edge 42 of each pack is not sealed, since the permeate must flow outwardly therefrom, the outer gaskets 28 preventing concentrate fluid from reaching the outer edges of the packs.

The inner gaskets 30, each have the shape shown in FIGS. 4 and 5, each inner gaskets having numerous axial grooves 32 in its upper face, and having steps in its upper and lower faces. The steps are formed so that the inner gaskets nest in one another, and the membrane packs are held between adjacent inner gaskets. The stack of inner gaskets is held together by the upper end plate 52 and by a lower end plate 70$^1$. As will be described below, the end plates 52, 70$^1$ are clamped together around their peripheries by tie bolts 72. The stack of inner gaskets 30 form a hollow shaft 74 along which the feed fluid passes in longitudinal movement to the levels of each of the feed regions 34 between the membrane packs, and with the grooves 32 of the gasket forming holes in the gasket-formed shaft through which the feed fluid passes. If one were to try to provide an additional central shaft in contact with the inner gaskets 30, then it would be necessary to provide higher precision of the inner gaskets 30 to assure that they uniformly contact any such shaft. By eliminating such an additional shaft and such contact with the inner gaskets, larger tolerances can be utilized in gasket manufacture. A central shaft can be utilized with the inner gaskets spaced from the shaft, except for a few centering bosses, so that part of the hub region enclosed by the stack of gaskets carries feed fluid longitudinally and the stack of gaskets still serves as a fluid distributing pipe.

The outer gaskets 28 are thin rings of high strength but light-weight material such as glass-fiber reinforced polyester plastic, that resist cold flow, and may be formed with cutouts around the exit holes of the membrane packs. Inasmuch as the outer gaskets must block the concentrate from leaking to the periphery of the rotor where it could contaminate the permeate, it is necessary to hold the outer gaskets firmly against the peripheral portions of the filtration packs. This is accomplished as shown in FIG. 6, by providing bosses 80 on the lower faces of the outer gaskets, and by providing corresponding boss-receiving holes 82 in the membrane packs. The bosses 80 are formed to a depth D slightly smaller than the thickness of the uncompressed membrane pack. In assembling the rotor, the bosses 80 of each outer gasket are laid in the holes of the disc pack 26 on which the gasket lies, the outer gasket is pressed down with a moderately high force, and ultrasonic vibrations are applied to ultrasonically weld the bottom of each boss 80 to the top of the next lower gasket. Of course a solvent or other adhesive can be used to weld the gaskets together.

A The depth D is chosen so that the outer gaskets press firmly against the pack to seal the gasket thereto, but with the force not being so great as to crush the support paper into grooves of the conduit sheet to block such grooves against the radially outward movement of permeate therethrough. When the rotor is assembled and the tie rods 72 (FIG. 4) are tightened, the tightening of the tie rods helps to maintain pressure of the outer seals against the membrane packs. However, reliable sealing of the outer gaskets to the membrane packs is assured without requiring such a high level of tightening of the tie rods 72 that the packs could be crushed to block the carrier against the radial outflow of permeate. Where it is desirable to permit disassembly of a stack, the bosses may be left unwelded to the adjacent gaskets. The bosses still serve, however, to control the degree of pack compression when the stack of packs is clamped tightly together by the rods or other clamping means.

The rotor is assembled by first stacking a number of membrane packs 26 on one another, with inner and outer gaskets between adjacent packs, and with each other gasket sealed to the next lower gasket as the packs and gaskets are place on one another. In the apparatus of FIGS. 1 and 4, the membrane packs are contained in modules 90, each module having a limited number of membrane packs such as 36 placed on one another to form a stack, with each module containing 36 packs and associated gaskets held on a support plate 48. In a typical rotor, a group of eight of such modules are assembled between the end plates 52 and are clamped together by the tie rods or bolts 72. The tie rods extend through holes in the support plates 48, so that the support plates brace the tie rods against centrifugal forces. The tie rods are largely exposed, so that they can be cleaned to remove bacteria lying in their threads, without fully disassembling the rotor, although the rods can be extended through holes in the outer gaskets and packs. A number of tie rods such as 24 of them, are uniformly spaced about the rotor to distribute the compressing forces. As can be seen in FIG. 3, each of the membrane packs has several exit holes spaced about its peripheral portion to carry away concentrate from many areas around the periphery of the pack.

The membrane packs and gaskets are thin, to permit a large number of packs to be included in an apparatus of given volume. For example, each pack and each outer gasket may have a thickness of one-tenth inch, so that a rotor containing eight modules with 36 membrane packs each, and with pack diameters of two feet, provides a membrane area of approximately 1,500 square feet in a volume of approximately 15 cubic feet, or in other words provides approximately 100 square feet of membrane area per cubic foot. Such a rotor may be operated at approximately 1000 rpm to produce an average centrifugal force of approximately 200 times the force of gravity.

Each module 26 is constructed by cutting large circles from sheets of plastic, support paper, and membrane material, with large holes being formed at the center of the circles and smaller exit holes 44 and boss-receiving holes 82 near the periphery. The plastic sheet is embossed to form grooves as shown in FIG. 8. Each sheet of support paper is injected with adhesive around its large central hole and around each exit hole, by placing a die about the sheet and injecting the adhesive. A silicone based adhesive is utilized because it can stick to a wet membrane, this being significant because most membranes cannot be allowed to dry out. After the adhesive has been injected into the support paper, it is allowed to dry to remove excess solvent, and the sheet is then baked at temperature such as 300°F for five minutes, to cross link the adhesive. This heating operation develops tackiness and greatly increases the cohesive strength of the adhesive. The sheets of paper are then positioned against the embossed plastic conduit sheet and the membranes, and the group of sheets are tightly pressed together.

In applications where the flux of permeate is low, as is typical in reverse osmosis, the porous sheets such as the support paper which supports the membranes, can be utilized without separate carrier sheets. FIG. 9 illustrates a portion of a membrane pack 100 which utilizes a thick sheet of support paper 102 to support the membranes 104, 106 and to carry permeate radially. The sheet 102 of support paper is impregnated with adhesive 108 around the exit holes to directly hold both membranes and to seal the exit hole area against the influx of concentrate.

The separation apparatus of this invention can be constructed for ultrafiltration or for reverse osmosis. In ultrafiltration, suspended particules such as bacteria or nondissolved chemicals are removed by utilizing an ultrafiltration membrane. In reverse osmosis, salt or other dissolved material are separated from the permeate by utilizing a reverse osmosis membrane.

FIG. 10 illustrates another embodiment of the invention, similar to that of FIG. 4, but utilized where the suspended or dissolved material which is to be separated from the permeate is of lower density than the permeate. The feed fluid enters the rotor 20A through a coupling 12A and passes along a channel 50A which leads to the periphery of the rotor. The feed fluid than passes longitudinally through aligned exit holes 44A of the membrane packs for distribution to the regions between packs. The feed fluid then moves radially inwardly while permeate passes into the packs 26X. The concentrate, which is of lower density than the original feed fluid, then passes through grooves 32A in inner gaskets. The concentrate moves longitudinally along the hub portion of the rotor, to exit at a coupling 54A. It may be noted that the rotor employs three containers sections 110 fastened together by fasteners 112, to hold the stacks of membrane packs in compression. The container formed by sections 110 is used instead of tie bolts to clamp the stack. The container sections have holes 114 through which the permeate passes to be received in a stationary housing 18A.

Thus, the invention provides a compact, economical, and reliable separation apparatus which can utilize a stack of membrane packs separated from one another by gaskets to provide regions between packs through which feed fluid passes. The packs are formed with exit holes that are substantially aligned, to form a pipe-like manifold for carrying away concentrate. In a centrifugal system wherein the packs are rapidly rotated, the exit holes are located near the peripheries of the packs so that all feed fluid flows radially between the hub and the peripheries of the packs, and a simple concentrate collecting pipe is provided in the stack. The spaces between the stacks are devoid of obstructions to such radial flow, so that considerable flow is obtained in spite of close spacing of the packs, Each of the packs of the separation apparatus includes a sheet-like carrier and membranes on opposite faces of the carrier. The carrier is of uniform thickness, particularly near the exit holes, to avoid steps in the faces of the carrier that could lead to wrinkling of the membranes. The carrier is impregnated around each exit hole, with a water-impervious adhesive material, to simultaneously seal the carrier against the inflow of concentrate and to hold the membrane securely to the faces of the carrier. Where the carrier includes sheets of support paper lying on a central conduit sheet, the support paper may be impregnated with the adhesive material. The packs also have central holes whose walls are impregnated with the adhesive material, the adhesive material serving to hold the pack together and allowing it to be pressure tested before it is assembled into a stack.

A rotor of the separation apparatus, which is formed by the packs and gaskets, can include a stack of inner gaskets which have aligned holes that form a central feed conduit along which the feed fluid can flow. The inner gaskets have radially extending grooves that form passages to feed the fluid between the packs. The stacks of packs can be held together by tie rods near the periphery of the packs. In addition to the tie rods holding the stack together, the outer gaskets can be welded to one another to assure sealing of the gasket to the packs even if localized compression by the tie rods is insufficient. The outer gaskets have bosses which extend through the packs and bear against adjacent packs. The bosses act as spacers which hold the gaskets spaced apart by a precise distance at which the peripheries of the packs are tightly compressed but not crushed.

Although particular embodiments of the invention have been described and illustrated herein, it is recognized that modification and variations may readily occur to those skilled in the art and consequently it is intended that the claims be interpreted to cover such modifications and equivalents.

What is claimed is:

1. Separation apparatus for receiving a feed fluid and for separating permeate from rejectant of the feed fluid, comprising:

a plurality of membrane packs arranged in a stack with the packs spaced from one another, each pack having a pair of membranes on either face thereof for passing permeate while preventing the passage of rejectant;

each of said packs having at least one exit hole extending therethrough, with the exit hole spaced from the center of the pack and projecting through both membranes of the pack, and said packs being arranged with their exit holes substantially aligned to form a pipe-like manifold for carrying away concentrate.

2. The apparatus described in claim 1 wherein:

said packs are stacked along a predetermined axis and said exit holes are located near the peripheries of said packs; and including means for feeding feed fluid between said packs at hub locations that are located near said axis; and means for rapidly rotating said stack about said axis.

3. The apparatus described in claim 1 wherein:

said exit holes are located near the peripheries of said packs; and the space between adjacent membrane packs, in the region between said inner and outer gaskets, is devoid of obstructions to radial flow; and including means for feeding feed fluid between said packs near said axis; and means for rapidly rotating said stack and gaskets about said longitudinal axis, to obtain an outward radial flow of fluid between the packs.

4. The apparatus described in claim 1 wherein:

each of said packs includes a carrier of uniform thickness extending up to the walls of said exit holes, and includes a pair of membranes extending up the walls of said exit holes and sealed to said carrier at said exit holes.

5. Separation apparatus comprising:
a sheet-like carrier; and
a pair of membranes lying over opposite faces of said carrier;
said carrier and membranes each having a plurality of holes, and said holes being aligned to form a plurality of pack exit holes;
said carrier being of substantially uniform thickness in the region about each exit hole so that the opposite faces of the carrier are free of steps in the region about each exit hole, and said membranes being sealed to said carrier about each exit hole, whereby to avoid wrinkling of said membranes.

6. The apparatus described in claim 5 wherein:
said carrier includes at least one sheet of support paper impregnated with adhesive about each of said exit holes and joined by said adhesive to a membrane.

7. Separation apparatus comprising:
a thin carrier;
a pair of membranes lying over opposite faces of said carrier;
said carrier and membranes each having a plurality of holes, and said holes being aligned to form a plurality of pack exit holes; and
a quantity of water-impervious adhesive material impregnating at least part of said carrier in a region about each of said holes, and holding said membranes to the opposite faces of said carrier to prevent the leakage of concentrate into said carrier.

8. The apparatus described in claim 7 wherein:
said carrier includes support sheets directly supporting said membranes, said support sheets having exit holes of the same size as the exit holes in said membranes, and said adhesive material lies in regions of said support sheets immediately surrounding each exit hole.

9. The apparatus described in claim 7 wherein:
said carrier and membranes form at least three exit holes spaced about the peripheral region of said membranes, and also form at least one central hole at the center of the carrier and membranes; and
the areas of said carrier and membranes lying about said at least three exit holes and said central hole are all impregnated with said adhesive material, whereby to hold said carrier and membranes together as a pack that can be tested for sealing integrity prior to installation in a machine.

10. The apparatus described in claim 7 wherein:
said carrier comprises a single adhesive material impregnates said support material along its entire thickness around each pack exit hole.

11. Separation apparatus comprising:
a stack of membrane packs disposed along a predetermined longitudinal axis, each pack including a sheet-like carrier and at least one membrane disposed thereagainst; and
means for separating said packs from one another including a plurality of substantially identical inner gaskets disposed between said packs at locations near the centers of said packs;
said inner gaskets having aligned holes to form a central feed conduit along which feed fluid can flow axially to reach each of the packs, and said inner gaskets having radially extending grooves forming passages for feeding feed fluid between the packs.

12. Separation apparatus comprising:
a stack of membrane packs disposed along a predetermined longitudinal axis, each pack including a sheet-like carrier and at least one membrane disposed thereagainst;
a plurality of inner gaskets disposed between said packs at locations near the centers of said packs;
a plurality of outer gaskets disposed between said packs at locations near the peripheries of said packs; and
a plurality of tie rods extending longitudinally near said outer gaskets to hold them pressed securely against said membrane packs.

13. The apparatus described in claim 12 wherein:
said inner gaskets have aligned holes to form a central feed conduit along which feed fluid can flow axially to reach each of the modules, and said inner gaskets have radially extending grooves forming passages for feeding feed fluid between the modules.

14. The apparatus described in claim 12 wherein:
each outer gasket is welded to adjacent gaskets with the pack between them being compressed therebetween whereby to prestress the stack to assure sealing without requiring intense tightening of the tie rods to a magnitude that could crush the packs and prevent fluid from passing to their peripheries.

15. Separation apparatus comprising:
a plurality of plate-like membrane packs arranged in a stack along a predetermined axis with the packs spaced from one another, and with each pack being porous to the passage of fluid radially to its periphery;
a plurality of ring-shaped gaskets disposed near the peripheries of said packs and separating said packs from one another;
each gasket being welded to adjacent gaskets with the pack between them being compressed therebetween, whereby to prestress the stack to assure sealing.

16. The apparatus described in claim 15 wherein:
each of said packs has a plurality of boss-receiving holes, and each gasket has a plurality of bosses extending through said boss-receiving holes of said packs and welded to the gasket lying on the opposite face of the pack.

17. A method for separating components of a feed fluid comprising:
rapidly rotating a rotor that has a stack of slightly separated membrane packs which have through holes near their peripheries, about a longitudinally extending axis, while maintaining said through holes substantially in alignment;
feeding said feed fluid into the hub region of said rotor, and admitting said feed fluid into the regions between said packs near the hub of said rotor, so that the feed fluid flows in parallel over all of said packs, and permeate can flow out of the feed fluid into said packs, and feed fluid becomes progressively concentrated as it moves radially outwardly to form a concentrate near the periphery of the rotor;
leading said concentrate in a substantially longitudinal direction through said holes of said packs, to gather said concentrate; and
removing said concentrate from said rotor.

18. A method for separating components of a feed fluid, wherein the feed fluid includes a permeate and also includes a nonpremeate of lower density than the permeate, comprising:

rapidly rotating a rotor that has a stack of slightly separated membrane packs which have through holes near their peripheries, about a longitudinally extending axis, while maintaining said through holes substantially in alignment;

conducting said concentrate in a substantially longitudinal direction through said holes of said packs, to distribute said feed fluid into regions between said packs at the peripheries of the packs, and flowing said feed fluid radially inwardly in parallel through the space between said packs, to the hub portions of said packs, so that the fluid forms a concentrate at the hub portions of the packs; and removing said concentrate from the hub portion of said rotor.

* * * * *